United States Patent
Joussot-Dubien et al.

(10) Patent No.: US 7,399,408 B2
(45) Date of Patent: Jul. 15, 2008

(54) DEVICE FOR SUPERCRITICAL WATER OXIDATION OF MATERIALS

(75) Inventors: Christophe Joussot-Dubien, Rochefort du Gard (FR); Gérard Didier, Roussas (FR); Hubert-Alexandre Turc, Les Angles (FR)

(73) Assignee: Commissariat A l'Energie Atomique (FR)

( * ) Notice: Subject to any disclaimer, the term of this patent is extended or adjusted under 35 U.S.C. 154(b) by 745 days.

(21) Appl. No.: 10/994,144

(22) Filed: Nov. 19, 2004

(65) Prior Publication Data

US 2008/0135496 A1 Jun. 12, 2008

Related U.S. Application Data

(62) Division of application No. 10/398,320, filed as application No. PCT/FR01/03101 on Oct. 9, 2001, now Pat. No. 6,878,290.

(30) Foreign Application Priority Data

Oct. 10, 2000 (FR) .................................. 00 12929

(51) Int. Cl.
*C02F 1/72* (2006.01)
(52) U.S. Cl. .................. 210/179; 210/205; 210/219; 422/184.1; 422/205; 422/226; 422/229; 588/312
(58) Field of Classification Search .................. 210/761
See application file for complete search history.

(56) References Cited

U.S. PATENT DOCUMENTS

| 4,564,458 | A | | 1/1986 | Burleson | 210/747 |
|---|---|---|---|---|---|
| 4,774,006 | A | * | 9/1988 | Kaufmann | 210/742 |
| 5,008,085 | A | | 4/1991 | Bain et al. | 422/109 |
| 5,358,646 | A | | 10/1994 | Gloyna et al. | 210/762 |
| 5,421,998 | A | | 6/1995 | Li et al. | 210/136 |
| 5,500,120 | A | * | 3/1996 | Baker | 210/179 |
| 5,552,039 | A | * | 9/1996 | McBrayer et al. | 210/90 |
| 5,571,424 | A | * | 11/1996 | Ahluwalia | 210/761 |
| 6,475,396 | B1 | * | 11/2002 | Wofford et al. | 210/758 |
| 6,878,290 | B2 | * | 4/2005 | Joussot-Dubien et al. | 210/761 |

FOREIGN PATENT DOCUMENTS

GB 647769 7/1948

OTHER PUBLICATIONS

"Supercritical Water Oxidation" Frisch, *Standard Handbook of Hazardous Waste Treatment and Disposal*, Section 8.11, pp. 8.176-8.190.

* cited by examiner

*Primary Examiner*—Peter A. Hruskoci
(74) *Attorney, Agent, or Firm*—Hayes Soloway P.C.

(57) ABSTRACT

A method and device for oxidization of materials in supercritical water. The method involves a) introducing a fluid containing water and an oxidizing agent in a ring-shaped area and through a first end of a substantially tube-shaped reactor comprising an external wall and an internal tube, b) heating the fluid in the ring-shaped area, c) introducing the heated fluid into the internal tube and simultaneously introducing material to be treated into said internal tube at a second end of the reactor, d) mixing the fluid and the material to be treated in a first portion of the internal tube, followed by cooling the obtained mixture in a second portion of the internal tube, and e) isobarically discharging the fluid/oxidized material from the internal tube of the reactor.

11 Claims, 1 Drawing Sheet

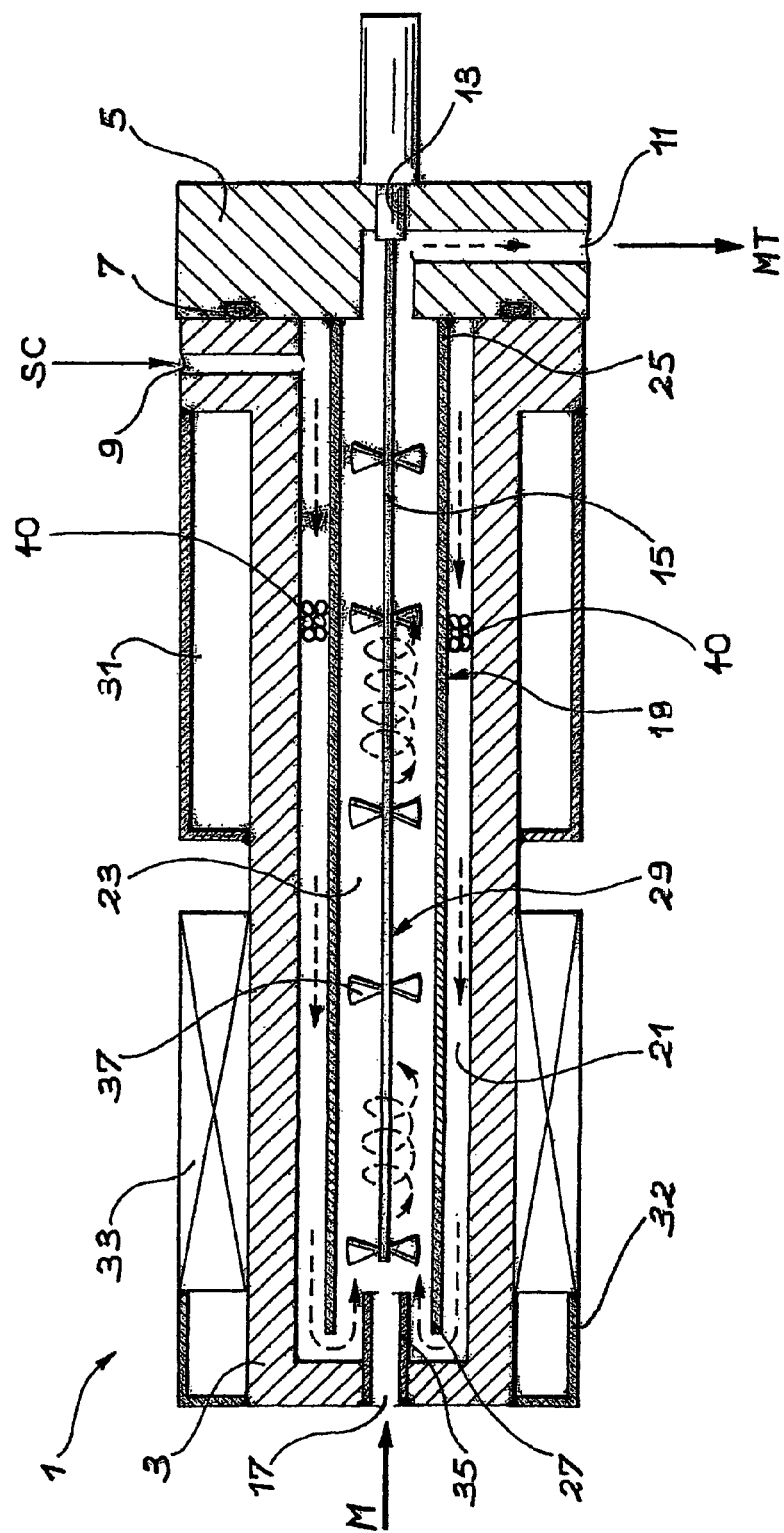

DEVICE FOR SUPERCRITICAL WATER OXIDATION OF MATERIALS

CROSS REFERENCE TO RELATED APPLICATIONS

This application is a divisional of U.S. application Ser. No. 10/398,320 filed Apr. 3, 2003, now U.S. Pat. No. 6,878,290, which is a 371 of PCT/FR01/03101, filed Oct. 9, 2001, which claims priority from French Patent Application Serial No. 00/12929, filed Oct. 10, 2000.

TECHNICAL FIELD

The present invention relates to a process for supercritical water oxidation of materials as well as to a device that can be used for implementing this process. The present invention also provides a process for treating wastes.

In the context of the invention material is defined as any substance or composition capable of being subjected to a hydrothermal oxidation process.

The applications of this process can relate, for example, to the destruction of materials such as toxic substances, organic compounds such as halogen solvents, or the treatment of materials such as highly toxic or hazardous organic effluents such as, for example, contaminated wastes, explosives, as well as solvents, biological or pharmaceutical compounds, industrial slurries or effluents of the petroleum industry, etc.

Hydrothermal oxidation (HTO) is a recent technology for treating wastes. It is carried out by means of water at a temperature and pressure as the reaction medium for reacting an oxidant with the component(s) to be degraded.

The oxidant can be in gas form—air, oxygen-enriched air, ozone, etc.—liquid oxygen, oxygen peroxide, etc.—when the oxidizing agent is mostly comprised of organic compounds in liquid form or in suspension in water. It can also be pure or diluted in water at concentrations varying from 20% by weight as described in Frisch, A. M. (1997), Supercritical Water Oxidation. Standard Handbook of Hazardous Waste Treatment and Disposal, H. M. Freeman, McGraw-Hill, p. 8.117-8.190.

The critical point of the water, Tc=374° C., Pc=221 bar allows two groups to be defined in HTO processes:

When one of the two operational conditions of the oxidation reaction is situated below the critical point of the water, such methods are also known as wet oxidation procedure (WOP), the oxidation reaction taking place in the aqueous phase, and When the two operating conditions of the oxidation reaction are situated above the critical point, one speaks of supercritical thermal oxidation (WTO), because the reaction takes place in the supercritical water in a homogeneous phase where all of the reactants are solubilized out of the salts, whose solubility products reduce consequent to the reduction of the electrical permittivity of the water with the increase of the pressure or temperature.

The WTO process differs from the WOP process principally by the fact that the reaction is much more rapid, the characteristic time are of the order of a minute instead of tens of minutes, and is often more complete, the rates of destruction systematically exceeding 99.99% instead of the 98% for WOP. On the other hand, WOP is less sensitive than WTO to the heteroatom content of the organic matrix of the wastes to be treated.

Because of the positioning of the WOP processes in low pressures and low temperatures; in other words, below the critical point, they do not enter into a competition with the supercritical processes.

PRIOR ART

In the early 80's the potentialities for destruction of organic wastes in supercritical water were established and numerous modifications were made thereafter in order to make possible treatment of more increasingly more diverse organic wastes. However, exploitation on the industrial scale still needed to be optimized.

Supercritical oxidation method is currently implemented in a rudimentary reaction zone comprised of a simple reactor. This technological solution has the advantage of being easy to construct as well as to use. In addition, its investment and maintenance costs are relatively low.

However, the composition of the wastes that can be destroyed in this type of reactor is rather limited by reason of the deposition of mineral compounds that create a blockage or due to the corrosion induced by the presence of halogen compounds. In fact, the presence of mineral salts at concentrations of the order of 1% in a supercritical water reactor generates precipitates that deposit on the walls of the reactor. In addition, when the waste contains more than several milligrams of chlorine, the stainless steel or the nickel-based materials undergo a corrosion to the disadvantageous requirements in industrial exploitation.

None of the developments have responded to the requirements for treatment of wastes containing corrosive compounds or mineral salts.

The objectives of the specialists in this method are as follows:

to obtain consistently elevated rates of destruction while reducing to the extent possible the passage time and reaction temperature, resistance to corrosion, and limiting the precipitation of the mineral salts.

It is therefore necessary to develop new devices in order to resolve these problems of rapid corrosion or accumulation of salts as described in Schmieder, H. and Abeln, J (1999). SCWO: Facts and Hopes. GVC Specialist Committee "High Pressure Chemical Engineering" Karlsruhe, pp. 81-86.

In addition, when it concerns adding a third compound, for example for increasing the solubility of a new chemical species, the current solutions are not applicable but to a very precise organic compound and thus cannot be extended to a mixture of wastes.

SUMMARY OF THE INVENTION

The present invention has specifically the object of providing a process for treating a material by hydrothermal oxidation that does not have the aforesaid drawbacks and which responds to the aforesaid objectives.

The method of the present invention comprises the following steps:

a) introducing a fluid comprising water and an oxidizer under a pressure above 22.1 MPa into an annular zone and at one end of an essentially tubular reactor comprising an outer wall and an inner tube, the annular zone of the reactor being defined by the outer wall and the inner tube;

b) heating the water/oxidizer fluid in said annular zone to a temperature above 374° C.;

c) introducing the heated and pressurized water/oxidizer fluid obtained in step b) into the inner tube of the reactor at a second end of the reactor and simultaneously introducing the material to be treated into said inner tube at said second end of the reactor;

d) mixing the heated and pressurized water/oxidizer fluid and the material to be treated into a first part of said inner tube in such a fashion as to oxidize the material to be treated, followed by cooling of the fluid/oxidized material mixture into a second part of the inner tube, and e) isobarically evacuating the cooled fluid/oxidized material mixture from the reactor directly from the inner tube to the one end of the reactor, the fluid and the material continuously or quasi-continuously running through the inner tube.

The material can be, for example, one of those cited in the present description, for example, the majority of the organic compounds oxidizable in supercritical water, for example aliphatic solvents such as hexane, dodecane, etc., the aromatic solvents such as benzene, phenol, toluene, pyridine, etc., the halogen solvents such as chloroform, dichloromethane, trichloroethane, etc.

The method can also be used for destroying a material such as toxic or hazardous organic compounds such as those comprising effluents contaminated with radio-elements generated by the nuclear industry, used oils, ion exchange resins, etc., chemical arms or explosives, as well as pharmaceutical compounds.

According to the invention, the material can be, for example, in the form of a waste for treatment, for example, liquid or in suspension.

Also, the present invention similarly provides a method for treatment of a waste by hydrothermal oxidation comprising especially a stage comprising the utilization of a process for treating a material by hydrothermal oxidation according to the invention, the material being the waste.

According to the invention, the oxidizer can be, for example, a gas chosen from the group comprising ozone and an oxygen-nitrogen mixture, or a liquid chosen from the group comprising hydrogen peroxide and liquid oxygen.

According to the invention, the oxidizer is preferably introduced with the water into the reactor in a quantity in the range of 1 to 5 times the stoichiometric quantity necessary to oxidize the material. This quantity can be determined specifically using the quantity of material to be treated, for example waste to be destroyed.

For example, in the case of a waste to be treated, it can be mixed with the fluid either pure or diluted in water, for example at a mass percent in the range of 10 and 100% or added from a third body present in order to facilitate the oxidation reaction or favoring precipitation of certain mineral salts. The third body can be, for example, soda, sodium nitrate, and nitric acid.

In step d) of the method of the invention, the mixture can be produced by agitation of the reaction medium formed by the mixture of the supercritical/material to be treated. The agitation allows on the one hand assuring a satisfactory temperature transfer between the flux and the heating and cooling zones and on the other hand avoiding sedimentation or accumulation of the mineral salts that can precipitate in the course of the procedure. It thus permits assuring that a minimal volume is employed in order to obtain destruction yields obtained in supercritical thermal water oxidation in standard configurations.

According to the invention, the heated mixing of the pressurized water/oxidizer fluid and of the material to be treated in the inner tube can be produced, for example, by means of an agitation operating in a state equivalent to that of a perfectly-agitated reactor or in a state which tends towards that of a perfectly agitated reactor. According to the invention, the pressurized heated water/oxidizer fluid mixture and the material to be treated in the inner tube can be produced, for example, using agitation, which confines the agitation to successive volumes in such a fashion as to obtain an essentially quasi-piston flow regime inside the inner tube of the pressurized heated water/oxidizer mixture and the treated material.

According to the invention, oxidation of the material of step d) releases heat, which can be used to heat by countercurrent the water/oxidizer fluid at step b). Thus, according to the invention, the supercritical fluid can be heated in the annular zone, for example between 374° C. and 600° C., on the one hand by the supercritical fluid/waste mixture passing in counter-current in the inner tube and on the other hand by a means of heating or heating zone such as that of the device according to the present invention.

According to the invention, in step e), cooling of the fluid/oxidized material mixture in the inner tube is preferably obtained under strong agitation.

The present invention also provides a device that can be used for implementing the method of the invention that utilizes a supercritical medium. This device comprises:

a main body comprised of a substantially tubular wall equipped at a first end with a flange, sealing means, a first inlet for the components of the supercritical mixture and an evacuation outlet for the treated material, the flange being eventually equipped with a tight passage for receiving a rotary shaft and a second of its ends having a second inlet for introducing the material to be treated into the device, the main body, the flange and the sealing means being made of materials resistant to the pressures of the supercritical media;

an inner tube disposed on the inside of the main body in such a fashion as to form an annular zone along said main body, the inner tube comprising a opening, a first end and a second end, the first end being fixed with the flange in such a fashion that the opening of the inner tube is isolated and in such a fashion tight with respect to the annular zone in communication at once with the treated material outlet and with the passage, the second end of the inner tube being at the second end of the main body in such a fashion that the opening is at this level in communication with the annular zone and with the second material inlet such that the material to be treated can be introduced at this point and not into the annular zone but directly into the lumen of the inner tube;

a agitation means disposed in the lumen of the inner tube and operated by means of a rotating shaft;

a refrigeration means disposed around the main body and over a first part of same in such a fashion as to cool the treated material situated inside the tube prior to its evacuation from the device through the treated material outlet, and a heating means disposed around the main body and over a second part of same in such a fashion as to heat the components of the supercritical medium in order to form the supercritical medium prior to its entry into the inner tube at its second end.

The inner tube 19 is preferably placed at a distance from the second entry of the main body thus assuring prevention of reflux of the material or of its degradation products towards the end of the inner tube, thus protecting the main body from any contact with the material in the supercritical medium.

According to the invention, the inlet for the components of the supercritical medium can be created by piercing the flange.

According to the invention, the device can comprise in addition a metal fitting disposed in all or part of the annular zone. Said fitting allows increasing the turbulence of the fluid flow within said zone, assuring an enhanced thermal transfer, and making possible the thermal transfer, and making possible the thermal transfer by conduction between the inner tube 19 and the main body.

According to the invention, the device can comprise in addition an injector making possible introduction of the material to be treated directly into the inner tube at the second inlet, preferably at a distance consistent with the end 27 of the inner tube in order to prevent the reflux of the material into the supercritical medium. The injector can be, for example, a tube with a diameter less than that of the inner tube.

According to the invention, another refrigeration means can be placed around the main body at the end where the material is injected.

According to the invention, the agitation means can comprise rotary elements chosen from a helix, a turbine, a flat blade, and an anchor. For example, in the case of utilization of blades, as a function of the geometry of the blades, the agitation effect can either tend in the direction of an operation equivalent to a perfectly agitated reactor or, if insertions are installed on the blades, agitation can be confined to successive volumes in order to conserve a quasi-piston flow regime. For example, in the case of helices, their number can vary and be chosen particularly as a function of the turbulence to be imposed on the system.

According to the invention, the rotating shaft can be associated with a drive motor coupled to a frequency variator allowing rotational speeds to be obtained in the range of 0 to 1,500 rpm.

According to the invention, the main body and the flange can be, for example, made of stainless steel or nickel-based or in any known material having the aforementioned required properties.

According to the invention, the seal means can comprise means making it possible to assure a tight connection between the main body and the flange, preferably up to $35 \times 10^5$ Pa and temperatures running, for example, from 20 to 250° C. Said seal means can be, for example, a type of joint either metallic, for example flat or Helicoflex (registered trademark) metal joint, or a high strength polymer. The connections known to the specialist in the art for this application can be utilized.

According to the invention, the seal means can comprise seal means at the passage in order to receive the rotating shaft. The temperature of the fluid at the level of said seal does not, in principle, exceed 250° C. and it is, for example, a rotating connection of the high pressure sealed joint for a rotary shaft. The joints know to the specialist in the art for this application can be used. A magnetic coupling of the standard type installed in the flange can also be used.

According to the invention, the materials comprising the injector, the inner tube, the agitation means can be chosen to be identical or different in virtue of their capacity to resist chemical attack. It is not necessary that they have a good hold under pressure. It is further not essential that these parts be made of the same material. Said latter can be chosen, for example, as a function of the chemical nature of the waste to be destroyed. For example, it can be chosen from the group comprising a stainless steel, a heat and oxidation resistant nickel alloy of the [Ni58, Fe20 Mo20] type, titanium, and ceramic. It may be, for example, an Iconel (trademark) or a Hastelloy (trademark).

In a device according to the present invention, all of these parts are subject to any significant mechanical stress. Preferably they have satisfactory behavior relative to temperature, especially up to 600° C. and to corrosion. These parts are also easily changeably and can be considered, under certain circumstances, as expendables.

According to the invention, the inner tube can, for example, have a thickness of approximately 1 mm.

When coupling, according to the present invention, the inner tube to the agitation system, the device has a number of operational advantages which are disclosed in the following.

The envelope forming the inner tube is in equipressure; in other words, it is not used in order to assure containment at the high pressures of the reactor. It is thus possible to use different materials having a good resistance to corrosion but a lesser resistance to mechanical stresses. In the case, wherein the thermal exchanged must be made over the small dimension surfaces, the materials that have good thermal conductivity are preferred, for example, titanium, noble metals, etc., with regard to the materials known for their very good chemical resistance but poor conductors such as ceramic.

Although the use of materials having better resistance to pressure prolongs the service life of the reactor as compared with corrosion, the standard inner tubular envelope is easy to access and its replacement involves little labor and low cost.

In addition, the internal elements of the device or reactor that are in direct contact with the waste of which are not subjected to the stress of high pressures and can be made of materials resistant to corrosion or easily renewable.

The device of the present invention thus allows carrying out an oxidation reaction in supercritical water by means of reactor having an inner envelope and an agitator in the reaction and refrigeration zones.

It makes possible having one of the ends of the reactor cold by imposing in the direction of circulation a counter-current from one end to the other of the wall. This involves that the agitation system used require only assuring a seal at high pressure with temperatures below 250° C. and not at the supercritical conditions of the water ($P_c$>221 bar and $T_c$>374° C.).

According to the invention, the refrigeration means placed around the main body can be, for example, a double-envelope refrigerant.

According to the invention, the heating means disposed around the main body can be, for example, in the form of a sleeve. It can, for example, be a cuff heater band. This type of cuff is known to the specialist in the art.

According to the invention, the total length of the device and the internal diameter of the main body depend on:
  integration of the inner tube or reaction tube and, possibly of the parts necessary for its alignment with the main body;
  on mechanical requirements, for example, $P_{max}$=350 bar.
  on thermal requirements: for example, the second end of the main body can be 600° C., while the first extremity, at the level of the flange with the seal, at 250° C.;
  integration and agitation in the inner tube
  on the holding time of the waste with the oxidizer in the hot zone, for example at a temperature T>400° C., comprised for example between 10 s and 5 minutes.
  on the holding time of the oxidized flux in a refrigeration zone sufficiently long in the inner tube to assure an exit temperature of the treated waste between 20 and 250° C.

According to the invention, the reactor has preferably a longitudinal form whose greater dimension corresponds to the axis of agitation.

The present invention provides, as a result, a reaction zone of hydrothermal oxidation allowing, in particular:

carrying out of the oxidation reaction between the material, for example a waste, and the oxidizer in the supercritical water medium; in other words, T>374° C. and P>22.1 MPa;

grouping the reaction zone and the cooling zone and assuring a strongly turbulent flow for better efficiency of thermal transfer and reaction kinetics, as well as preventing sedimentation of the precipitated metal salts before, during and after oxidation of the material;

using an simple inner tube or envelope without the requirement of pressure that is in contact with the initial material, for example the waste, and the oxidized fluid in the high temperature zones. Said inner tube or envelope can be interchangeable in order to either adapt to the construction material to the nature of the material to be treated, for example to the waste to be eliminated, or to utilize a less onerous material in order to carry out maintenance of the corroded parts;

implement an agitation means for the reaction zone situated in the inner tube that is standard and simple to install;

The technical means provided by the present invention are, in particular:

the definition of a pressurized compartment, whose tight joints of the large diameter openings are at temperatures lower than 250° C.;

utilization of an internal tube not subjected to the pressure requirements in the main body, which can be called an autoclave, under pressure, for confining the organic compounds and the oxidation reactions to a zone resistant to or allowing corrosion and not having to assure the hold in pressure constituted by the lumen of the inner tube;

the opportunity to utilize a standard high-pressure magnetic coupling in a low temperature zone for operating the agitator blades in the zones in the temperature range of 20 to 600° C.

The supercritical water oxidation reactor of the present invention is distinguished especially from those of the prior art by the implementation of an agitation system in the inner envelope in equipressure.

According to the present invention, the agitation has the role, in particular, of assuring an especially turbulent operation, so as to:

facilitate the thermal transfers for heating the fluids prior to entry into the reaction zone but also for cooling the fluids and treated materials after oxidation;

assure a very satisfactory temperature homogeneity and of the reaction mixture composition over the radial axis of the reactor;

guarantee the short holding time in order to obtain optimal rates of destruction and thus to operate with a lower volume under pressure and temperature than that of the prior art;

maintain in suspension all of the particles either that are contained in the initial waste or that form after oxidation of the organic matrix of the waste. By avoiding sedimentation of the mineral salts in the reaction zone and in the cooling zone, in particular at passage of the critical point, formation of a blockage no longer occurs as opposed to the prior art, and it is thus possible to operate over longer periods with wastes, whose content in mineral compounds is, for example, between 0 and 20%.

Other features and advantages will become obvious when reading the examples that are provided illustratively and non-limitingly hereinbelow with reference to the attached FIGURE.

FIGURE

FIG. 1 is a diagram of one embodiment of the device according to the invention.

EXAMPLES

Device

FIG. 1 is a diagram of one embodiment of the device according to the present invention. It represents in particular a reaction zone according to the present invention.

In this embodiment, the device 1 comprises a main body 3 having a substantially tubular form and equipped at the first of its ends with a flange 5, sealing means 7, a first inlet 9 for the components of the supercritical medium, and an evacuation outlet 11 for the treated material. The flange 5 is equipped with a sealed passage 13 for receiving the rotating shaft 15.

The second end of the main body 3 is provided with a second inlet 17 for introducing the material to be treated into the device. The main body, the flange and the sealing means are made of materials resistant to the pressures and temperatures of the supercritical medium.

An inner tube 19 is disposed on the inside of the main body 3. It forms an annular zone 21 along the length of said main body. Said inner tube comprises a lumen 23, a first end 25 and a second end 27. The first end 25 is fixed to the flange 5 in such a fashion that the lumen 23 of the inner tube 19 is, isolated and sealed with regard to the annular zone 21, in communication at once with the treated material outlet 1 and with the passage 13. The second end 27 of the inner tube is at the second end of the main body 3 in such a fashion that the lumen 23 is at this point in communication with the annular zone 21 and with the second inlet 17. Thus, the material to be treated can be introduced, at this point, not into the annular zone 21 but directly into the lumen 23 of the inner tube 19.

An agitation means 29 comprised of a rotating shaft 15 operating it and the rotary elements 37 is place in the lumen 23 of the inner tube 19. A rotary joint of the high pressure type sealing joint for a rotary shaft (not shown) is placed at the level of the passage 13 for receiving the rotating shaft 15.

A refrigeration means 31 is placed around the main body and over a first part of same in such a fashion as to cool the treated material situated in the inner tube 19 prior to its evacuation from the device 1 through the treated material outlet 11.

Another refrigeration means 32 can also be placed over the second end of the main body.

A heating means 33 is placed around the main body and over a second part of same in such a fashion as to heat the constituents of the supercritical medium in order to form the supercritical medium before it enters into the inner tube 19 at the level of the second end 27.

The outer part of the main body 3 of the device of the present invention, whose function it is namely to maintain a pressure in the range of 220 and 350 bar and to assure satisfactory heat transfer between the inner reaction zone and the exchangers, will be described now and then the internal elements will be described.

The Main Body or Autoclave

The main body 3 is made of stainless steel. The same applies to the flange 5. The sealing means 7, or joint, between the body and the flange is a Helicoflex (registered trademark) metal joint or another joint having an endurance for a temperature >250° C.

The flange 5 is provided with a spur or evacuation outlet 11 for evacuating the supercritical medium/treated waste mixture from the inner tube 19 after the oxidation reaction and subsequent cooling. The spur or passage allows only the flow originating in the inside of the reaction tube 19. It is sufficiently wide to facilitate circulation of a fluid containing material in suspension.

A metal fitting (not shown) in the form of stainless steel balls can be placed in the annular zone. The use of such a fitting is explained above.

A frequency variator is coupled to the agitator motor making it possible to obtain rotational speeds of the blades between 0 and 1,500 rpm.

The Reaction Tube

The inner reaction tube 19 is the seat of the supercritical water oxidation reaction.

Its wall is of a thickness of approximately 1 mm, its inner and outer surfaces are in equipressure. An agitator is arranged on the inside and comprises a central shaft 15 and blades 37.

The temperature on the inside of the tube 19 can reach to 600° C. in the zone where the organic compounds of the wastes are oxidized. This temperature is then lowered to between 20 and 250° C. in the part in the proximity of the refrigerating envelope 31.

The Method

The water and the oxidizer are introduced cold under pressure through the port 9 into the annular zone 21 between the inner tube 19 and the high pressure wall comprising the main body 3, in order to form a diphasic mixture. This diphasic mixture transfers part of its calories originating from the hot flux comprised of the fluid water/waste mixture present in the inner tube towards the refrigerated double envelope where a refrigerated fluid circulates.

The fluid; that is, the mixture of water and oxidizer, circulates initially in the annular zone 21 between the main body 3, forming the chamber of the device, and the inner tube 19. This zone or annular space 21 is the seat of a heat transfer between the fluid at the inside of the inner tube 19 and the refrigeration means or cooler 31.

While in the annular zone 21, the water+oxidizer fluid is then brought to 400° C. by an external exchanger or heating means 33. The water+oxidizer product is pre-heated in addition by a part of the calories originating from the fluid circulating in the lumen of the tube 19 by counter-current.

Having arrived at the second end of the main body or chamber, the hot fluid enters into the inner tube 19 at the same time as the waste. The proportion of organic compounds comprising the waste in the water is preferably between 1 and 15% by weight at the level of the inlet to the inner tube 19.

The supercritical fluid and the waste are mixed on the inside of the inner tube 19 and form the reaction mixture.

The waste, as well as the supercritical waste/fluid mixture, do not come into contact with the inner walls of the main body 3 because the waste is introduced directly to the inside of the inner tube 19 by means of the injector 35 formed simply by means of a small tube of very small diameter.

The point of injection of the waste via the injector 35 is preferably situated at a distance from the end 27 of the tube 19 greater than 5 times at least of the inside diameter of the tube 19, so as to prevent reflux of the material or its degradation products towards the end 27, thus protecting the body 3 from any contact with the material in the supercritical medium.

The oxidation reaction takes place in the inner tube. It releases heat which is in part used for counter-current heating of the initial water+oxidizer mixture situated in the annular zone 21.

The flow of the reaction mixture is then cooled in the inner tube 19 by being strongly agitated by the shaft 19 equipped with blades 37 in order to assure good heat transfer. The blades 37 serve also to maintain in suspension the mineral salts that would have precipitated. The cold effluent is then direction isobarically towards the outlet 11.

The inventors have oxidized in a first time dodecane in supercritical water at 450° C. and at $3\times10^5$ Pa using the device and the method disclosed hereinbefore.

Yields greater than 99.9% were obtained.

They then tested the operational conditions given in the following in Table 1 for treating the constituent elements of wastes indicated in Table 2 below.

TABLE 1

| Operational Conditions | | | |
|---|---|---|---|
| Pressure | Temperature | Nature of the Oxidant | Mass concentration of the waste at the inlet to the reaction zone (%) |
| 221-350 | 380-650 | $O_2$ | 1-15 |
|  | $H_2O_2$ | $O_2$—$N_2$ mixes |  |

TABLE 2

| Compositions of Oxidizable Wastes | |
|---|---|
| Constituting Elements of the Wastes | Proportion of the Constituents (%) |
| Carbon, hydrogen, oxygen, nitrogen | 0-100 |
| Halogens (chlorine, fluorine, phosphorous, etc.) | 0-10 |
| Mineral salts | 0-20 |

The yields obtained are the same as the aforesaid.

The invention claimed is:

1. An oxidation device for the treatment of a material in a supercritical medium comprising:

a main body comprised of a substantially tubular wall equipped at a first end with a flange, a seal, a first inlet for components of supercritical mixture and an evacuation outlet for treated material, the flange being eventually equipped with a tight passage for receiving a rotary shaft and a second of its ends having a second inlet for introducing material to be treated into the device, the main body, the flange and the seal being made of materials resistant to pressures of supercritical medium;

an inner tube disposed on the inside of the main body in such a fashion as to form an annular zone along the length of said main body, the inner tube comprising an opening or lumen, a first end and a second end, the first end being fixed with the flange in such a fashion that the lumen of the inner tube is isolated and in such a fashion tight with respect to the annular zone in communication with the treated material outlet and with the passage, the second end of the inner tube being at the second end of the main body in such a fashion that the lumen is at this level in communication with the annular zone and with the second material inlet such that the material to be treated can be introduced at this point and not into the annular zone but directly into the lumen of the inner tube and without reflux of same to the annular zone;

an agitator disposed in the lumen of the inner tube and driven of a rotating shaft;

a refrigeration device disposed around the main body and over a first part of same in such a fashion as to cool the treated material situated inside the tube prior to its evacuation from the device through the treated material outlet, and a heating device disposed around the main body and over a second part of same in such a fashion as to heat the components of the supercritical medium in order to form the supercritical medium prior to its entry into the inner tube at its second end.

2. The device according to claim 1, comprising in addition a metal fitting disposed in all or in part of the annular zone.

3. The device according to claim 1, comprising in addition an injector for introduction of the material to be treated directly into the inner tube from the second inlet.

4. The device according to claim 3, wherein the injector is a tube having a diameter less than that of the inner tube.

5. The device according to claim 1, wherein the inner tube has a thickness of approximately 1 mm.

6. The device according to claim 1, wherein the rotating shaft is associated with a drive motor coupled to a frequency variator enabling obtaining rotational speed of the blades in the range of 0 to 1,500 rotations per minute.

7. The device according to claim 1, wherein the agitator comprises rotating elements selected from the group consisting of a helix, a turbine, a flat blade and an anchor.

8. The device according to claim 1, further including an injector, wherein the injector, the inner tube and the agitator are made of an identical or a different heat and oxidation resistant material from the group consisting of a stainless steel, a nickel alloy, a titanium, and a ceramic.

9. The device according to claim 8, wherein the nickel alloy comprises Ni58, Fe20, Mo20.

10. The device according to claim 1, wherein the refrigeration device placed around the main body is a double refrigerating envelope.

11. The device according to claim 1, wherein the heating device placed around the main body is in the form of a sleeve.

* * * * *